United States Patent [19]

Kato et al.

[11] 4,153,334

[45] May 8, 1979

[54] STEREOSCOPIC IMAGE OBSERVING APPARATUS

[75] Inventors: Yasuo Kato, Kodaira; Tsutomu Komoda, Tokyo; Teruichi Tomura, Kunitachi, all of Japan

[73] Assignee: Hitachi, Ltd., Japan

[21] Appl. No.: 802,436

[22] Filed: Jun. 1, 1977

[30] Foreign Application Priority Data

Jun. 9, 1976 [JP] Japan .................. 51-66538

[51] Int. Cl.² ............................................. G02B 27/22
[52] U.S. Cl. .................................... 350/132; 250/306
[58] Field of Search .......................... 358/88; 250/310; 350/136, 132

[56] References Cited

U.S. PATENT DOCUMENTS

| 4,026,555 | 5/1977 | Kirschner et al. | 273/102.2 R X |
| 4,039,829 | 8/1977 | Kato et al. | 250/310 X |

*Primary Examiner*—John K. Corbin
*Assistant Examiner*—Scott J. Sugarman
*Attorney, Agent, or Firm*—Craig & Antonelli

[57] ABSTRACT

Apparatus wherein an identical field of view of an object to-be-observed is imaged in two directions different from each other and wherein the image in one of the directions and the image in the other direction are reproduced and displayed as a left eye image and a right eye image respectively, thereby to perform the stereoscopic version of the object to-be-observed, comprising means to indicate one mark on each of the left eye image and the right eye image, and means to move both the marks to any desired positions on the respective images. The mark moving means has the function of interlockingly moving both the marks by equal distances in the same direction on the respective images, and the function of singly moving only the mark on one of the images as the position of the mark on the other image is kept fixed, and it is provided with means to control the change-over between the interlockingly moving state and the singly moving state. In moving the marks to points on the respective images as correspond to desired points on the object to-be-observed, both the marks may be interlockingly moved until the mark on the other image arrives at the desired point, and subsequently, with the mark position on the other image kept fixed, only the mark on the one image may be singly moved to the desired point.

5 Claims, 3 Drawing Figures

STEREOSCOPIC IMAGE OBSERVING APPARATUS

BACKGROUND OF THE INVENTION

1. Field of the Invention

This invention relates to improvements in apparatus wherein two images, obtained by imaging an identical field of view on an object to-be-observed in directions different from each other, are presented to the left eye and the right eye of an observer, thereby to make the stereoscopic observation of the object to-be-observed possible. More particularly, it relates to a system for appointing positions on the images in such stereoscopic image observing apparatus.

As objects to which this invention is applicable, there can be mentioned, for example, stereoscopic image observing apparatus in various television systems such as industrial television; stereoscopic image observing apparatus in physical and chemical appliances such as scanning electron microscope, transmission type electron microscope, X-ray micro analyzer and ion microprobe analyzer; and stereoscopic image observing apparatus in medical diagnostic appliances such as X-ray photograph equipment and ultrasonic imaging equipment.

2. Description of the Prior Art

The stereoscopic image observing apparatus according to this invention presents two images individually to the left eye and the right eye of an observer, the two images being obtained by imaging an identical field of view on an object to-be-observed in directions different from each other, and thereby makes the stereoscopic observation of the object to-be-observed possible.

In such stereoscopic image observing apparatus, it is sometimes necessary to measure the three-dimensional distance between any desired two points in a stereoscopic image. To this end, it is necessary to make definite those positions on two plane images to which any desired one point in the stereoscopic image corresponds.

In order to measure the three-dimensional distance between any desired two points in a stereoscopic image, an apparatus has been developed wherein marks are respectively indicated at two positions on two plane images as correspond to the two points and wherein the three-dimensional distance between the two points in the stereoscopic image is calculated from the two-dimensional distance between the two marks on each of the plane images, as described in U.S. Pat. No. 4,039,829 entitled "Stereoscopic Measuring Apparatus," issued Aug. 2, 1977.

In order to appoint by the marking any desired one point in the stereoscopic image formed of the two plane images, it is required to put a pair of marks into the corresponding positions on both the plane images in such a manner that one mark lies at one position. Moreover, the pair of marks need be moved to the respective positions on both the plane images (left eye image and right eye image) as correspond to the desired one point in the stereoscopic image.

The prior-art apparatus has been so constructed that, for the location of the pair of marks, the movement of the mark on the left eye image and the movement of the mark on the right eye image are carried out quite independently. It has therefore involved the disadvantages that the locating operation is troublesome and that the construction of the apparatus is complicated.

SUMMARY OF THE INVENTION

It is accordingly an object of this invention to provide, in apparatus as described above in which the stereoscopic image observation is done with two plane images, a simpler system which serves to move marks to respective positions on both the plane images as correspond to any desired one point on a stereoscopic image while observing the stereoscopic image.

In order to accomplish this and other objects, according to this invention, in moving the marks on the two plane images forming the stereoscopic image to the respective positions which correspond to the desired one point in the stereoscopic image, the marks on both the plane images are moved in interlocking by equal distances in the same direction on the respective images, and when one of the marks has arrived at the desired position, the interlocked state is released, and only the other mark is singly moved to the desired position as the one mark is kept stationary at its desired position.

Usually, the left eye image and the right eye image which form the stereoscopic image are alike to each other, and a coordinate point on the left eye image and a coordinate point on the right eye image as correspond to one point in the stereoscopic image are close relatively. Accordingly, in moving the mark on one of the images to the coordinate point corresponding to the one point in the stereoscopic image, the mark on the other image is moved in interlocking with the movement of the mark on the one image, whereby when the one mark has reached the predetermined coordinate point, also the other mark has moved to near the predetermined coordinate point. Accordingly, by singly moving only the other mark by a very slight distance after the release of the interlocked state, the other mark can be brought to the predetermined coordinate point. Therefore, as compared with the system in which both the marks are moved individually from the beginning as in the prior art, the system of this invention renders the locating operation for both the marks remarkably simple. Besides, since both the marks can be moved by a single moving mechanism, the construction of the apparatus becomes simple.

The other objects and features of this invention and functional effects achieved thereby will become self-evident from the following description of the preferred embodiments.

DESCRIPTION OF THE PREFERRED EMBODIMENTS

Before the detailed description of the embodiments of this invention, the principle of a mark moving system in the stereoscopic image observing apparatus of this invention will be briefly explained with reference to FIG. 3.

Figure 3:
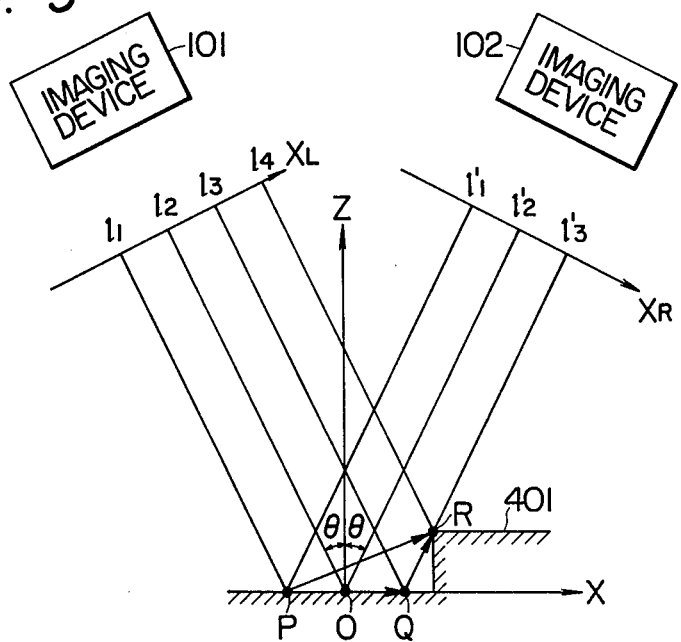
FIG. 3 is a view for explaining the principle of a mark moving system in the stereoscopic image observing apparatus according to this invention.

FIG. 3 schematically shows the state in which the surface of an object to be observed (sample) 401 is being imaged by two imaging devices 101 and 102. Now, consider a case where the surface of the sample 401 has a stepped part as shown and where the three-dimensional distance from a point P to a point R on the surface of the sample is to be measured.

Two images obtained by the imaging devices 101 and 102 are individually reproduced and displayed as a left eye image and a right eye image, respectively. The images are individually observed with the left eye and the right eye. Thus, the stereoscopic observation of the surface of the sample becomes possible. The three-dimensional distance from the point P to the point R on the surface of the sample can be calculated from the distance from the point P to the point R on the left eye image (that is, the distance from a coordinate point $l_1$ to a coordinate point $l_4$ on a plane $x_L$ in the figure) and the distance from the point P to the point R on the right eye image (that is, the distance from a coordinate point $l_1'$ to a coordinate point $l_3'$ on a plane $x_R$ in the figure). (For details, refer to the specification of U.S. Pat. No. 4,039,829.

To this end, the following is necessary. One mark is provided on each of the left eye image and the right eye image. While observing the stereoscopic image on the surface of the sample, the marks on the images are respectively moved from the coordinate points $l_1$, $l_1'$ corresponding to the point P on the surface of the sample to the coordinate points $l_4$, $l_3'$ corresponding to the point R. The distances of movements of the marks are individually evaluated.

Heretofore, the movement of the mark on the left eye image and that of the mark on the right eye image have been individually executed. This expedient has the disadvantages that the operation is troublesome and that the construction of the apparatus becomes complicated.

In this invention, the movement of the mark on the left eye image and that of the mark on the right eye image are interlocked, thereby to move the respective marks by equal distances in the same direction on the coordinate planes $x_L$ and $x_R$. When the mark on one image (the right eye image in the illustration) has arrived at the coordinate point $l_3'$ corresponding to the point R on the sample surface, the interlocked state is released. As the mark on the right eye image is kept stationary at the coordinate point $l_3'$, only the mark on the left eye image is singly moved and is caused to arrive at the coordinate point $l_4$ corresponding to the point R on the sample.

Owing to such mark moving system, when the mark on the right eye image has reached the coordinate point $l_3'$ corresponding to the point R on the sample surface, the mark on the left eye image has been moved to the coordinate point $l_3$ corresponding to the point Q on the sample, and hence, the distance of movement of the mark on the left eye image after the release of the interlocking may be small. Accordingly, the operation for moving the marks is facilitated, and a mechanism for the operation can be simplified. Hereunder, the embodiments of this invention will be described in detail with reference to FIGS. 1 and 2.

Figure 1:
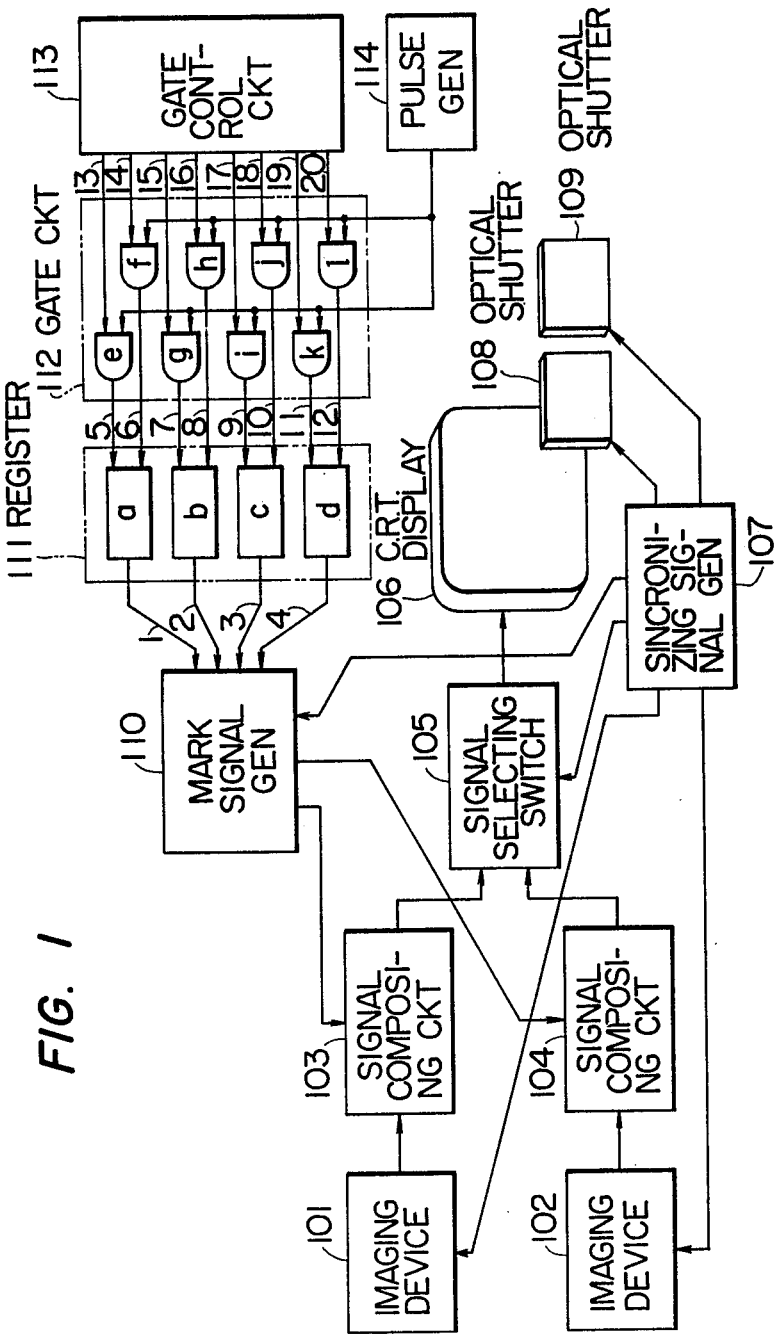
FIG. 1 is a block diagram which shows an embodiment of stereoscopic image observing apparatus according to this invention.

FIG. 1 is a block diagram which shows the general construction of stereoscopic image observing apparatus embodying this invention. In the figure, numerals 101 and 102 designate imaging devices for a left eye image and a right eye image, respectively. The imaging device may be either a conventional television camera or an ultrasonic imaging device. Further, it may be a scanning electron microscope. Essentially, it may be any device which takes out in time sequence secondary signals obtained by scanning an object to-be-observed in two dimensions with an energized beam such as light beam, ultrasonic beam and electron beam and which thereby provides video signals representative of a two-dimensional scanning image of the object to be observed. Besides, the number of the imaging devices need not be always two, but a single imaging device may be used for imaging the object to-be-observed alternately in two different directions so as to alternately generate the video signals of the left eye image and the right eye image. Further, the imaging device can be replaced with a memory which stores left eye image signals and right eye image signals therein.

Numerals 103 and 104 indicate signal composing circuits for composing the video signals from the imaging devices 101 and 102 and mark signals from a mark signal generator 110. Shown at 105 is a signal selecting switch for effecting the change-over between left eye image signals and right eye image signals. Numeral 106 denotes a C. R. T. display, and numeral 107 a synchronizing signal generator.

Numerals 108 and 109 indicate electrooptical shutters for the left eye and the right eye, respectively. When the left eye image is displayed by the C. R. T. display 106, the optical shutter 108 is opened and the optical shutter 109 is closed. Conversely, when the right eye image is displayed, the shutter 108 is closed and the shutter 109 is opened. Accordingly, a stereoscopic image of the object to be observed can be observed by observing the image screen of the C. R. T. display 106 through the shutters 108 and 109.

The mark signal generator 110 serves to generate video signals of marks which are to be indicated on the left eye image and the right eye image. It fetches X- and Y-coordinate values of the marks on the left eye image and the right eye image as stored in a register 111, and generates the mark signals when an electron beam for an image in the C. R. T. display has been deflected to the coordinate positions. The mark may be indicated either as a bright spot or as a black spot on the image. For example, the mark signal generator 110 can be constructed of a counter which counts the number of horizontal scanning lines from the time of the initiation of the vertical scanning of the C. R. T. display and which generates a first pulse when the number of counts has coincided with the Y-coordinate value of the mark, and another counter which counts the number of clock pulses from the time of the generation of the first pulse and which produces the mark signal when the number of counts has coincided with the X-coordinate value of the mark.

The mark signal for the left eye image and the mark signal for the right eye image as thus obtained are composed with the left eye image signal from the imaging device 101 and the right eye image signal from the imaging device 102 through the medium of the signal composing circuits 103 and 104, respectively.

By alternately changing-over the signal selecting switch 105 in synchronism with the vertical scanning period of the C. R. T. display 106, accordingly, the left eye image and the right eye image are displayed on the image screen of the C. R. T. display 106 in the alternate periods of the vertical scanning.

The register 111 storing the coordinate values of the marks on the left eye image and the right eye image therein consists of up-down counters a and b which store the X-coordinate values and Y-coordinate values of the mark on the left eye image therein, respectively, and up-down counters c and d which store the X-coordinate values and Y-coordinate values of the mark on the right eye image therein, respectively. These up-down counters function in such a manner that when pulses are inputted from input lines 5, 7, 9 and 11, the number of counts (that is, a stored coordinate value) is increased by a number equal to that of the inputted pulses, whereas when pulses are inputted from input lines 6, 8, 10 and 12, the number of counts is decreased by a number equal to that of the inputted pulses. Accordingly, the marks on the left eye image and the right eye image can be moved to any desired positions by increasing or decreasing the numbers of counts of the up-down counters.

Numeral 112 designates a gate circuit for controlling the inputting of the pulses to the up-down counters, numeral 113 a control circuit for the gate circuit, and numeral 114 a pulse generator. The gate circuit 112 consists of AND gates e, g, i and k which serve to control the numbers of the input pulses for increasing the numbers of counts of the up-down counters a, b, c and d, respectively, and AND gates f, h, j and l which serve to control the numbers of the input pulses for conversely decreasing the numbers of counts of the up-down counters a, b, c and d, respectively. Each of the AND gates is enabled and permits a pulse from the pulse generator 114 to pass therethrough only when a gate opening signal is received from the gate control circuit 113. Accordingly, the distance of movement of the mark can be varied by adjusting the duration of the gate opening signal, and it can be known by sensing the increase or decrease of the numbers of the pulses having passed through the AND gates, in turn, the numbers of counts of the up-down counters.

With the mark moving system according to this invention as described above, the marks on the left eye image and the right eye image are, at first, moved in a manner interlocked with each other. Subsequently, only one of the marks (the mark on the left eye image in the illustration) is singly moved.

Therefore, the gate control circuit 113 usually transmits the gate opening signals which are common to the AND gates e and i, f and j, g and k, and h and l, respectively. At that time, the number of counts of the counter a representative of the X-coordinate value of the mark on the left eye image and the number of counts of the counter c representative of the X-coordinate value of the mark on the right eye image increase or decrease by numbers equal to each other. Likewise, the number of counts of the counter b representative of the Y-coordinate value of the mark on the left eye image and the number of counts of the counter d representative of the Y-coordinate value of the mark on the right eye image increase or decrease by numbers equal to each other. Under this state, accordingly, the mark on the left eye image and the mark on the right eye image move in interlocking by equal distances in the same direction. Under a specified state (the state in which the interlocking is released), the gate control circuit 113 transmits the gate opening signals to only the gates e, f, g and h and does not transmit any gate opening signal to the other AND gates i, j, k and l. At that time, only the numbers of counts of the counters a and b which represent the X- and Y-coordinates of the mark on the left eye image respectively are increased or decreased, whereas the numbers of counts of the counters c and d which represent the X- and Y-coordinates of the mark on the right eye image respectively are neither increased nor decreased. Under this state, accordingly, only the mark on the left eye image is singly moved, and the mark on the right eye image is not moved at all.

Figure 2:
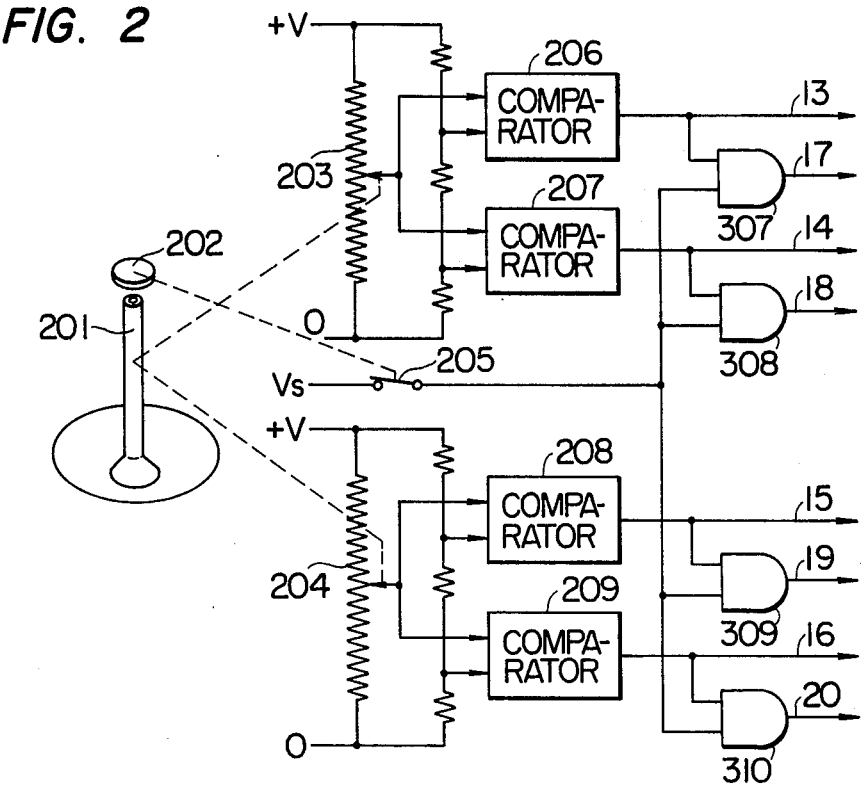
FIG. 2 is a block diagram which shows an example of construction of a gate control circuit in the apparatus shown in FIG. 1.

FIG. 2 shows a specific example of construction of the gate control circuit 113 for executing the mark moving system as stated above. In this example, a driving mechanism which is usually called "joy stick" is employed as a device for commanding the movements of the marks. When a lever of the joy stick 201 is thrown down in a direction in which the marks are to be moved, output voltages of a potentiometer for the X-axis 203 and a potentiometer for the Y-axis 204 are simultaneously changed in response to the direction in which the lever is thrown down and to the angle by which it is thrown down.

In case of increasing the X-coordinate value of the mark, the output voltage of the potentiometer 203 rises, whereas in case of decreasing the X-coordinate value of the mark, the output voltage of the potentiometer 203 lowers. Likewise, in case of increasing the Y-coordinate value of the mark, the output voltage of the potentiometer 204 rises, whereas in case of decreasing the Y-coordinate value of the mark, the output voltage of the potentiometer 204 lowers.

A comparator 206 compares the output voltage of the potentiometer 203 as applied to one input terminal thereof and a first reference voltage applied to the other input terminal thereof, and provides a positive output pulse only when the output voltage of the potentiometer 203 is higher than the first reference voltage. A comparator 207 compares the output voltage of the potentiometer 203 as applied to one input terminal thereof and a second reference voltage applied to the other input terminal thereof, and provides a positive output pulse only when the output voltage of the potentiometer 203 is lower than the second reference voltage. Here, the first reference voltage is selected to a value being somewhat greater than the output voltage value (V/2) of the potentiometer 203 at the time when the potentiometer is in the neutral state, and the second reference voltage is selected to a value being conversely somewhat smaller than the same.

Similarly, a comparator 208 produces a positive output pulse only when the output voltage of the potentiometer 204 is higher than a third reference voltage for comparison, while a comparator 209 produces a positive output pulse only when the output voltage of the potentiometer 204 is lower than a fourth reference voltage for comparison. Here, the third reference voltage is selected to a value being somewhat greater than the output voltage value (V/2) of the potentiometer 204 at the time when the potentiometer is in the neutral state, and the fourth reference voltage is selected to a value being conversely somewhat smaller than the same.

The output pulses of the comparators 206, 207, 208 and 209 are respectively delivered to signal lines 13, 14, 15 and 16 without any change as the gate opening signals for increasing or decreasing the coordinates of the mark on the left eye image. In the case where AND gates 307, 308, 309 and 310 are open, the output pulses of the comparators 206, 207, 208 and 209 are also delivered to signal lines 17, 18, 19 and 20 respectively and become the gate opening signals for increasing or decreasing the coordinates of the mark on the right eye image. Under this state, the mark on the left eye image and the mark on the right eye image are moved in interlocking by equal distances in the same direction.

A switch button 202 is disposed at the fore end of the lever of the joy stick 201. When a normally-closed switch 205 is opened by depressing the button 202, a gate opening signal $V_s$ is prevented from entering the AND gates 307, 308, 309 and 310, and all these gates 307, 308, 309 and 310 are closed. At that time, no gate opening signal is delivered to the signal lines 17, 18, 19 and 20, so that the mark on the right eye image is not moved and that only the mark on the left eye image is singly moved by the gate opening signals delivered to the signal lines 13, 14, 15 and 16.

When the depression of the switch button 202 is ceased, the switch 205 is closed again, and the gate opening signal $V_s$ is transmitted to the AND gates 307, 308, 309 and 310. In consequence, all these gates are simultaneously opened, and the mark on the left eye image and the mark on the right eye image are again moved in interlocking with each other.

When the apparatus is so constructed that the oscillation frequency of the pulse generator 114 in FIG. 1 is changed in correspondence with the inclination angle of the joy stick, the moving speed of the mark can be adjusted by adjusting the inclination angle of the joy stick.

As set forth above, according to this invention, merely by manipulating the single lever and the single switch, the marks can be moved to positions on the left eye image and the right eye image as correspond to any desired points in the stereoscopic image. The operation for moving the marks becomes remarkably simpler than in the prior-art apparatus.

We claim:

1. In an apparatus for observing the stereoscopic image of an object to-be-observed by the use of a left eye image and a right eye image which are obtained by imaging an identical field of view on the object to-be-observed in two directions different from each other, a stereoscopic image observing apparatus comprising means for indicating one mark on each of said left eye image and said right eye image, means for moving both the marks on the respective images interlockingly with each other, and means for releasing the interlocking and moving only one of said marks.

2. An apparatus according to claim 1, wherein the means for moving the marks interlockingly and releasing the interlocking includes variable voltage means to provide a voltage proportional to the position of the marks, means coupled to the variable voltage means to move one of the marks in accordance with the voltage of the variable voltage means, gate means coupling the variable voltage means to means for moving the other mark in accordance with the voltage of the variable voltage means, and means for controlling the gate means to connect the variable voltage to the means for moving the other mark so that both marks are moved interlockingly in response to the variable voltage source and to disconnect the variable voltage means from the means for moving the other mark so that only the one mark will be moved in response to the variable voltage source.

3. In an apparatus for observing the stereoscopic image of an object to-be-observed by the use of a left eye image and a right eye image which are obtained by imaging an identical field of view on the object to-be-observed in two directions different from each other, a stereoscopic image observing apparatus comprising means for indicating one mark on each of said left eye image and said right eye image, means for moving the mark on said right eye image, means for interlockingly operating the moving means for both said marks, and means for operating only one of said moving means for both said marks.

4. In an apparatus for observing the stereoscopic image of an object to-be-observed and measuring a distance between two points in relation to the object by the use of a left eye image and a right eye image of the object and the two points in relation to the object which are obtained by imaging an identical field of view on the object in two directions different from each other, a stereoscopic image observing apparatus comprising means for indicating one mark on each of said left eye image and said right eye image, means for moving both the marks on the respective images interlockingly with each other to measure the distance between the two respective points on each of the images, and means for releasing the interlocking after one of the marks completes its movement between the two points on its respective image and moving only the other mark until it completes its movement between the two points on its respective image.

5. An apparatus according to claim 4, wherein the means for moving the marks interlockingly includes variable voltage means to provide a voltage proportional to the position of the marks, means coupled to the variable voltage means to move one of the marks in accordance with the voltage of the variable voltage means, gate means coupling the variable voltage means to means for moving the other mark in accordance with the voltage of the variable voltage means, and means for controlling the gate means to connect the variable voltage to the means for moving the other mark so that both marks are moved interlockingly in response to the variable voltage source and to disconnect the variable voltage means from the means for moving the other mark so that only the one mark will be moved in response to the variable voltage source.

* * * * *